United States Patent Office 3,166,178
Patented Jan. 19, 1965

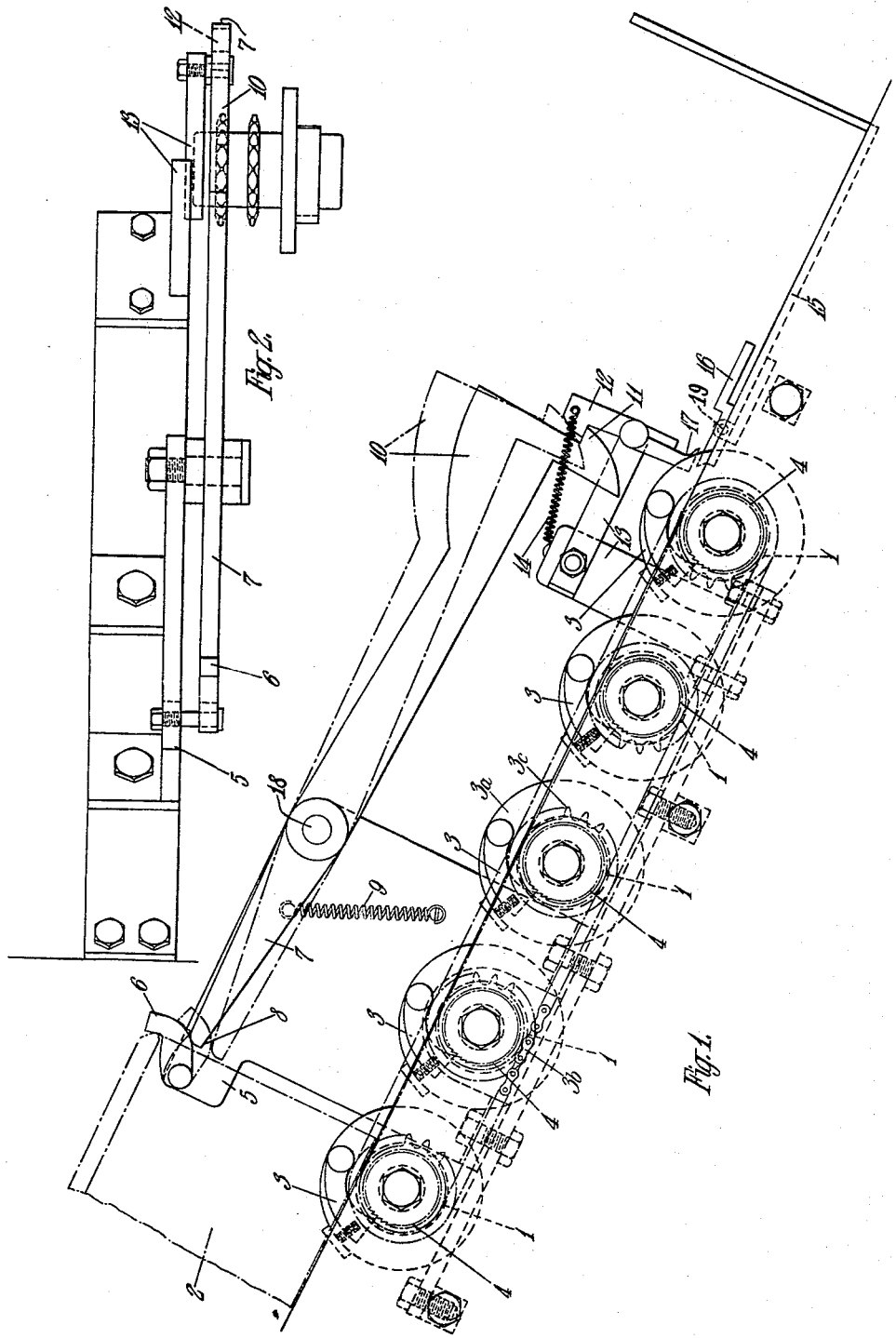

3,166,178
ASSEMBLY UNIT FOR ARTICLES DISCHARGED FROM A CONVEYOR SYSTEM
John H. W. Smith, New Malden, Surrey, Edward F. Thomson, Otford, near Sevenoaks, Kent, and William Gibson, St. Leonards-on-Sea, Sussex, England, assignors to The Daily Mirror Newspapers Limited, London, England
Filed June 29, 1962, Ser. No. 206,367
1 Claim. (Cl. 198—34)

In British Patent No. 706,569 there is described an assembly unit for articles discharged from a conveyor system, which comprises a conveyor table and drive means actuable by switch means responsive to the discharge of an article from a conveyor system onto said table to move the latter, in operation of the system and assembly unit, through a predetermined distance, whereby a succession of articles may be assembled along the conveyor table with regular spacing irrespective of the frequency of discharge from the conveyor system. The unit, which is especially suitable for assembling stereo or like arcuate printing plates, may incorporate an up-ending device, adapted to receive articles successively from the conveyor system, up-end them and discharge them on to the conveyor table.

Now, we have found that, although the unit is well adapted to stack articles as aforesaid irrespective of the frequency of discharge from the conveyor system, in the sense that the articles are neatly and regularly positioned when discharged at widely varying intervals, difficulties may arise if the rate of discharge at any moment is unduly high. There may then result an accumulation of articles waiting to be discharged, touching one another and so interfering with the smooth operation of the unit.

This invention consists in an assembly unit for articles discharged from a conveyor system comprising a conveyor table and drive means actuable by switch means responsive to the discharge of an article from the conveyor system on to said table to move the latter through a predetermined distance, whereby a succession of articles may be assembled along the conveyor table with regular spacing irrespective of the frequency of discharge from the conveyor system, the assembly unit optionally comprising an up-ending device, adapted to receive articles successively from the conveyor system, up-end them and discharge them on to the conveyor table, and the assembly unit including means for releasing, one at a time, articles which may have accumulated at the discharge end of the conveyor system for successive and separate discharge onto the conveyor table or into the up-ending device, as the case may be.

Various expedients may be adapted for holding back any following articles whilst a leading article is being discharged, and for releasing the first of any held-back articles on return of the loading mechanism of the units to an article-receiving condition. According to a preferred arrangement there is provided a retractable stop member for holding back following articles by arrangement against the first thereof, and conveyor drive means arranged to accelerate, or allow the acceleration of, a leading article relative to a next-following article on the conveyor system when the leading article is released by withdrawal of the stop member, to create a gap between the first two articles into which the stop member can be inserted when the leading article has passed. A latch and trip mechanism may be incorporated to hold the stop member advanced and then retract it or permit it to retract by trip operation responsive to resumption by the loading mechanism for the unit of an article-receiving condition. Stop-setting mechanism may be incorporated to advance the stop member positively in response to advance of a leading article.

It is preferred that the discharge end portion of the conveyor system should incline downwardly so as to afford a gravity feed, and be provided with driven-ratchet-controlled rollers affording predetermined maximum speeds, the maximum speed for the conveyor section beyond the stop member being greater than that in advance of the stop member. When an article is held back on the driven-ratchet-controlled rollers, the driven ratchet will continue to turn whilst the rollers remain stationary. The term "ratchet" will be understood broadly as meaning a one-way clutch.

The invention has especial reference to the conveyance and assembling of stereo plated and like cylindrical or otherwise arched segments, for which the stop-setting mechanism may be positioned within the tunnel defined by a segment on the conveyor. The last-mentioned mechanism may comprise a pivoted arm arranged to advance the stop member upwards by engagement therewith at one end when its other end is depressed by engagement within and against the top of a leading segment passing thereover. The latch mechanism may be arranged to latch said other end in a down position to hold the member up.

The invention will be described further with reference to the accompanying drawings of which:

FIGURE 1 is a sectional side view of the discharge end of a conveyor system, and FIGURE 2 is a plan view of stop-setting mechanism of FIGURE 1.

The conveyor system comprises a plurality of rollers 1 defining a downwardly inclined track for conveying arched semi-cylindrical, i.e. arch-shaped stereo plates 2 (of which only one is shown). Where the edges of the stereo plates rest on the rollers the latter are surfaced with a friction composition to prevent the plates from sliding downwards. Pawls are mounted on rotary members 3a which are rotatably mounted on respective shafts; chains 3b drive the rotary members 3a by means of gear teeth 3c. The pawls 3 co-operate with ratchet teeth 4 on wheels fixed on the roller shafts, so that stereo plates are permitted to move down the inclined track at a predetermined maximum speed; this is greater by a ratio of 2:1 for the rollers shown than for the preceding rollers of the track. Mounted centrally of the track above the level of the rollers, on an upstanding support 5, is a pivoted stop 6 which, in the "up" position shown in full line, engages the leading arched edge of a stereo plate at the top of the latter, to arrest its progress down the conveyor. Also pivoted on support 5, at a position 18 spaced from the stop 6, is an arm 7 the rear end 8 of which is biassed downwardly by a spring 9. End 8 supports stop 6, whilst the opposite end 10, in its normal, rest position, is elevated above the path of the top of stereo plates 2. Thus, when a stereo plate passes down the conveyor system, it is permitted to accelerate by the faster-driven rotary members 3a and, in passing over arm 7, depresses end 10 to lift end 8 and, with it, stop 6. A latch mechanism is provided by an element 11 on the arm 7 and an element 12 pivotally mounted on a bracket 13. A spring 14 urges the element 12 into engagement with the element 11. As a stereo plate moves down the conveyor system and passes over and depresses the end 10 of the arm 7, the end 8 and stop 6 are raised to move the stop 6 into the path of movement of the following stereo plate 2 and prevent movement thereof down the conveyor system.

An up-ending device 15 is swingably mounted at the end of the conveyor system and serves to receive and up-end a stereo plate 2 delivered from the conveyor system. A trip 16 is pivotally mounted at 19 on the forward upper edge of the device 15. The trip 16 is pivotally movable in a counterclockwise direction from the position shown in FIG. 1, but is not movable in a clockwise direction from this position.

In operation an arched stereo plate 2 moves from the conveyor system to the device 15 and by means of arched shape of the plate 2 the same passes over the trip 16 without interference. The device 15 swings in a clockwise direction as viewed in FIG. 1 to up-end the plate deposited thereon, and during this movement the trip 16 engages the strike 17 on the latch element 12, but since the trip 16 is free to pivot in a counterclockwise direction movement of the device 15 will not be impeded and the trip 16 passes the striker 17 without moving the latch element 12. Upon return counterclockwise movement of the device 15 the trip 16 engages the striker 17, and since the trip 16 cannot move clockwise with respect to the device 15 beyond the position shown in FIG. 1, engagement with the striker 17 will result in disengaging the latch element 12 from the latch element 11 to permit counterclockwise movement of the arm 7 about the pivot 18. This serves to lower the stop 6 below the upper edge of the following stereo plate 2 and permit movement of the same down the conveyor system whereupon the above-described operation is repeated. The arm 10 is then free to move under the influence of its biassing spring 9 whereupon stop 6 is lowered to permit the next stero plate 2 to move forward. Resilient rollers or disks (not shown) may be mounted above the conveyor system to hold the stereoplates in firm engagement with the speed-controlled conveyor rollers.

We claim:

An assembly unit for articles discharged from an end section of a conveyor system, the assembly unit including means for releasing, one at a time, articles which may have accumulated at the discharge end of the conveyor system for successive and separate discharge, said means comprising a retractable stop member for holding back following articles by engagement against the first thereof, the discharge end portion of the conveyor inclining downwardly so as to afford a gravity feed, and incorporating idler rollers having overspeed controls affording predetermined maximum speeds, the maximum speed for the conveyor section beyond the stop member being greater than that in advance of the stop member to create a gap between the two leading articles, into which gap the stop member can be inserted, latch means for releasably retaining said stop member in article engaging position, a swingable transfer device for receiving an article from said conveyor and movable in one direction to transfer an article from said conveyor to another location, and means on said transfer device for engaging said latch means upon movement of said transfer device in the other direction to release said latch means and permit said stop member to move out of article engaging position, thereby permitting the article previously engaged by said stop member to move along said conveyor.

References Cited by the Examiner
UNITED STATES PATENTS

| | | | |
|---|---|---|---|
| 699,244 | 5/02 | Rubin | 198—26 X |
| 770,260 | 9/04 | Cahill | 198—76 |
| 2,935,173 | 5/60 | Cozzoli. | |
| 3,024,890 | 3/62 | Belk | 198—34 |

SAMUEL F. COLEMAN, *Acting Primary Examiner.*

EDWARD A. SROKA, WILLIAM B. LA BORDE,
*Examiners.*